United States Patent
Shen et al.

(10) Patent No.: US 8,553,609 B2
(45) Date of Patent: Oct. 8, 2013

(54) METHOD, SYSTEM AND DEVICE FOR TRANSMITTING AND DETECTING CONTROL SIGNALING IN BACKHAUL LINK

(75) Inventors: Zukang Shen, Beijing (CN); Libo Wang, Beijing (CN); Xueming Pan, Beijing (CN); Shaohui Sun, Beijing (CN); Wenjian Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/582,025

(22) PCT Filed: Mar. 21, 2011

(86) PCT No.: PCT/CN2011/072000
§ 371 (c)(1),
(2), (4) Date: Aug. 30, 2012

(87) PCT Pub. No.: WO2011/116675
PCT Pub. Date: Sep. 29, 2011

(65) Prior Publication Data
US 2012/0327842 A1     Dec. 27, 2012

(30) Foreign Application Priority Data
Mar. 22, 2010     (CN) .......................... 2010 1 0130981

(51) Int. Cl.
*H04W 4/00*     (2009.01)

(52) U.S. Cl.
USPC ........................................................ 370/315

(58) Field of Classification Search
USPC ........................................ 370/315, 329, 330
See application file for complete search history.

(56) References Cited

U.S. PATENT DOCUMENTS

2007/0177545 A1     8/2007     Natarajan et al.
2009/0245188 A1*    10/2009    Fukuoka et al. .............. 370/329

(Continued)

FOREIGN PATENT DOCUMENTS

CN     101374015     2/2009
CN     101442755     5/2009

OTHER PUBLICATIONS

International Search Report for PCT/CN2011/072000 dated Jun. 23, 2011.

(Continued)

*Primary Examiner* — Mark Rinehart
*Assistant Examiner* — Mohammad Anwar
(74) *Attorney, Agent, or Firm* — Foley & Lardner LLP; James F. Ewing

(57) ABSTRACT

A method, system and device for transmitting and detecting control signaling in a backhaul link are disclosed in the present application, and the application relating to the wireless communication field is used for saving time-frequency resources occupied by a base station for transmitting the control signaling on a Relay Physical Downlink Control Channel (R-PDCCH) of the backhaul link and reducing the complexity of the R-PDCCH detection by a relay node. In the present application, the base station, according to the preset correspondence between the control signaling and the R-PDCCH resource sub-regions, determines the R-PDCCH resource sub-region corresponding to the control signaling to be transmitted among a plurality of resource sub-regions included in the resource region occupied by the R-PDCCH; the control signaling to be transmitted is transmitted to the relay node by using the time-frequency resources in the determined R-PDCCH resource sub-region; the relay node acquires the location information of the R-PDCCH resource sub-region and detects the control signaling to be transmitted in the R-PDCCH resource sub-region according to the location information. With the present application, the time-frequency resources occupied by the base station for transmitting the control signaling on the R-PDCCH are saved and the complexity of the R-PDCCH detection by the relay node is reduced.

13 Claims, 5 Drawing Sheets

(56) References Cited

U.S. PATENT DOCUMENTS

2010/0281323 A1* 11/2010 Wang et al. .................... 714/748
2011/0194511 A1* 8/2011 Chen et al. .................... 370/329

OTHER PUBLICATIONS

Written Opinion of the International Search Authority for PCT/CN2011/072000 dated Jun. 23, 2011.

* cited by examiner

METHOD, SYSTEM AND DEVICE FOR TRANSMITTING AND DETECTING CONTROL SIGNALING IN BACKHAUL LINK

This application is a US National Stage of International Application No. PCT/CN2011/072000, filed on 21 Mar. 2011, designating the United States, and claiming claims priority from Chinese Patent Application No. 201010130981.3 filed with the Chinese Patent Office on Mar. 22, 2010 and entitled "Method, System and Device for Transmitting Control Signaling and Detecting Signaling in Backhaul Link", all of which are herein incorporated by reference in their entirety.

FIELD OF THE INVENTION

The present invention relates to the field of wireless communication and particularly to a method, system and device for transmitting and detecting control signaling in a backhaul link.

BACKGROUND OF THE INVENTION

In the Long Term Evolution-Advanced (LTE-A) system, a Relay Node (RN) device is introduced to improve the throughput of the system and enlarge network coverage, and as illustrated in FIG. 1, an Evolved NodeB (eNB) is connected to the Core Network (CN) via a wired interface, an RN is connected to the eNB via a wireless interface, and a User Equipment (UE) is connected to the RN or the eNB via a wireless interface.

A link between the RN and the base station is referred to as a backhaul link, and a link between the RN and the UE is referred to as an access link.

There are two channels in the backhaul link, i.e., a Relay Physical Downlink Control Channel (R-PDCCH) over the backhaul link and a Relay Physical Downlink Shared Channel (R-PDSCH) over the backhaul link. The eNB transmits related control signaling to the RN by using time-frequency resources occupied by the R-PDCCH, and then the RN performs blind detection in a range of time-frequency resources occupied by the R-PDCCH to obtain the corresponding control signaling.

The R-PDCCH and the R-PDSCH are multiplexed in two modes: FIG. 2 is a schematic diagram of a multiplexing mode that the R-PDCCH and the R-PDSCH adopt Time Division Multiplexing (TDM) plus Frequency Division Multiplexing (FDM); FIG. 3 is a schematic diagram of a multiplexing mode that the R-PDCCH and the R-PDSCH adopt FDM.

During achieving the invention, the inventors have found the following technical problems in the prior art:

In the existing solution, the eNB transmits control signaling to the RN by using time-frequency resources occupied by the R-PDCCH, and then the RN has to perform blind detection in the entire range of time-frequency resources occupied by the R-PDCCH to obtain the control signaling so that more time-frequency resources are occupied by the eNB to transmit the control signaling over the R-PDCCH and there is high complexity for the RN to detect the R-PDCCH.

SUMMARY OF THE INVENTION

Embodiments of the invention provide a method for transmitting control signaling in a backhaul link of a relay system and a base station to save time-frequency resources occupied by the base station to transmit the control signaling on the R-PDCCH.

A method for transmitting control signaling in a backhaul link of a relay system includes:

determining, by a base station, control signaling to be transmitted on a Relay Physical Downlink Control Channel, R-PDCCH, in a current backhaul link;

determining, by the base station, an R-PDCCH resource sub-region corresponding to the control signaling to be transmitted among a plurality of R-PDCCH resource sub-regions, into which a resource region occupied by the R-PDCCH is divided, according to a preset correspondence relationship between the control signaling and the R-PDCCH resource sub-region; and transmitting, by the base station, the control signaling to be transmitted to a relay node by using time-frequency resources in the determined R-PDCCH resource sub-region.

A base station includes:

a signaling determining unit configured to determine control signaling to be transmitted on a Relay Physical Downlink Control Channel, R-PDCCH, in a current backhaul link;

a region determining unit configured to determine an R-PDCCH resource sub-region corresponding to the control signaling to be transmitted among a plurality of R-PDCCH resource sub-regions, into which a resource region occupied by the R-PDCCH is divided, according to a preset correspondence relationship between the control signaling and the R-PDCCH resource sub-region; and a signaling transmitting unit configured to transmit the control signaling to be transmitted to a relay node by using time-frequency resources in the determined R-PDCCH resource sub-region.

In the invention, the base station determines the control signaling to be transmitted on the current R-PDCCH; the base station determines the R-PDCCH resource sub-region corresponding to the control signaling to be transmitted among a plurality of R-PDCCH resource sub-regions, into which the resource region occupied by the R-PDCCH is divided, according to the preset correspondence relationship between the control signaling and the R-PDCCH resource sub-region; then the base station transmits the control signaling to be transmitted to the relay node by using the time-frequency resources in the determined R-PDCCH resource sub-region. As can be seen, in the invention, the resource region occupied by the R-PDCCH is divided into a plurality of R-PDCCH resource sub-regions, and the control signaling to be transmitted is transmitted in the R-PDCCH resource sub-region corresponding to the control signaling to be transmitted instead of transmitting the control signaling to be transmitted in the entire resource region occupied by the R-PDCCH, thereby saving time-frequency resources occupied by the base station to transmit the control signaling on the R-PDCCH.

Embodiments of the invention further provide a method for detecting control signaling in a backhaul link of a relay system, a relay node device and an LTE-A communication system to reduce the complexity for the RN to detect the R-PDCCH.

A method for detecting control signaling in a backhaul link of a relay system includes:

obtaining, by a relay node, location information of one or more Relay Physical Downlink Control Channel, R-PDCCH, resource sub-regions, wherein the R-PDCCH resource sub-regions are R-PDCCH resource sub-regions formed by dividing a resource region occupied by an R-PDCCH; and for each R-PDCCH resource sub-region among the one or more R-PDCCH resource sub-regions, determining control signaling corresponding to the R-PDCCH resource sub-region according to a preset correspondence relationship between the R-PDCCH resource sub-region and the control signaling and detecting the control signaling in the R-PDCCH resource sub-region according to the location information of the R-PDCCH resource sub-region.

A relay node device includes:

a configuration information obtaining unit configured to obtain location information of one or more Relay Physical Downlink Control Channel, R-PDCCH, resource sub-regions, wherein the R-PDCCH resource sub-regions are R-PDCCH resource sub-regions formed by dividing a resource region occupied by an R-PDCCH; and a signaling detecting unit configured, for each R-PDCCH resource sub-region among the one or more R-PDCCH resource sub-regions, to determine control signaling corresponding to the R-PDCCH resource sub-region according to a preset correspondence relationship between the R-PDCCH resource sub-region and the control signaling and to detect the control signaling in the R-PDCCH resource sub-region according to the location information of the R-PDCCH resource sub-region.

A Long Term Evolution-Advanced, LTE-A, communication system includes:

a base station configured to determine control signaling to be transmitted on a Relay Physical Downlink Control Channel, R-PDCCH, in a current backhaul link; to determine an R-PDCCH resource sub-region corresponding to the control signaling to be transmitted among a plurality of R-PDCCH resource sub-regions, into which a resource region occupied by the R-PDCCH is divided, according to a preset correspondence relationship between the control signaling and the R-PDCCH resource sub-region; and to transmit the control signaling to be transmitted to a relay node by using time-frequency resources in the determined R-PDCCH resource sub-region; and the relay node configured to obtain location information of the R-PDCCH resource sub-region and to detect the control signaling to be transmitted in the R-PDCCH resource sub-region according to the location information.

In the invention, the relay node, when detecting control signaling, firstly obtains pre-configured location information of one or more R-PDCCH resource sub-regions into which the resource region occupied by the R-PDCCH is divided; then for each R-PDCCH resource sub-region, determines the control signaling corresponding to the R-PDCCH resource sub-region according to the preset correspondence relationship between the R-PDCCH resource sub-region and the control signaling and detects the control signaling in the R-PDCCH resource sub-region according to the location information of the R-PDCCH resource sub-region. As can be seen, in the invention, the relay node detects the control signaling in the R-PDCCH resource sub-region corresponding to the control signaling according to the configuration information instead of detecting the control signaling in the entire resource region occupied by the R-PDCCH, thereby effectively reducing the complexity for the relay node to detect the R-PDCCH.

DETAILED DESCRIPTION OF THE EMBODIMENTS

In order to save time-frequency resources occupied by a base station to transmit control signaling on an R-PDCCH and to reduce the complexity for an RN to detect the R-PDCCH, embodiments of the invention provide a method for transmitting and detecting control signaling in a backhaul link of a relay system, and in this method, a resource region occupied by an R-PDCCH is divided into a plurality of R-PDCCH resource sub-regions, and when control signaling is transmitted to an RN, the control signaling is transmitted only by using a R-PDCCH resource sub-region corresponding to the control signaling.

Figure 1:
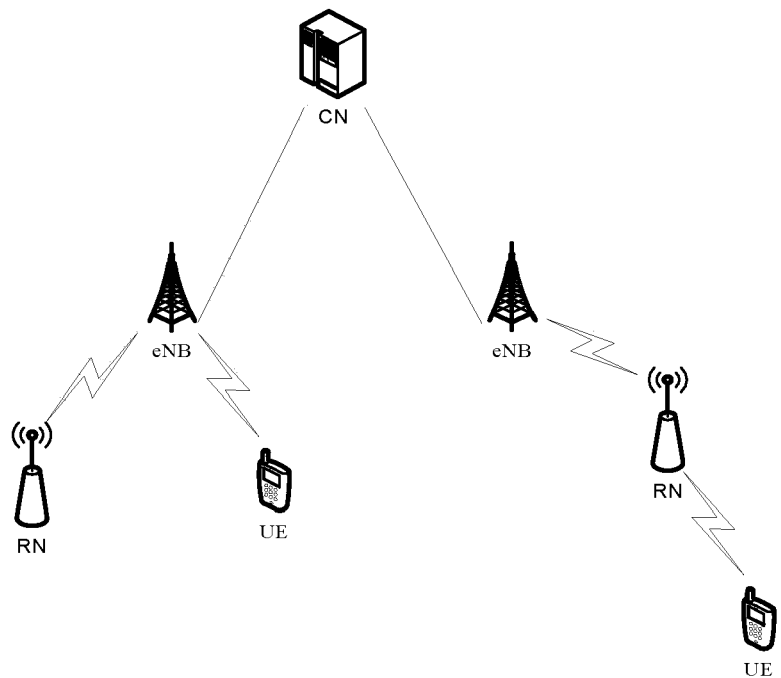
FIG. 1 is a schematic structural diagram of the LTE-A system in the prior art.
Figure 2:
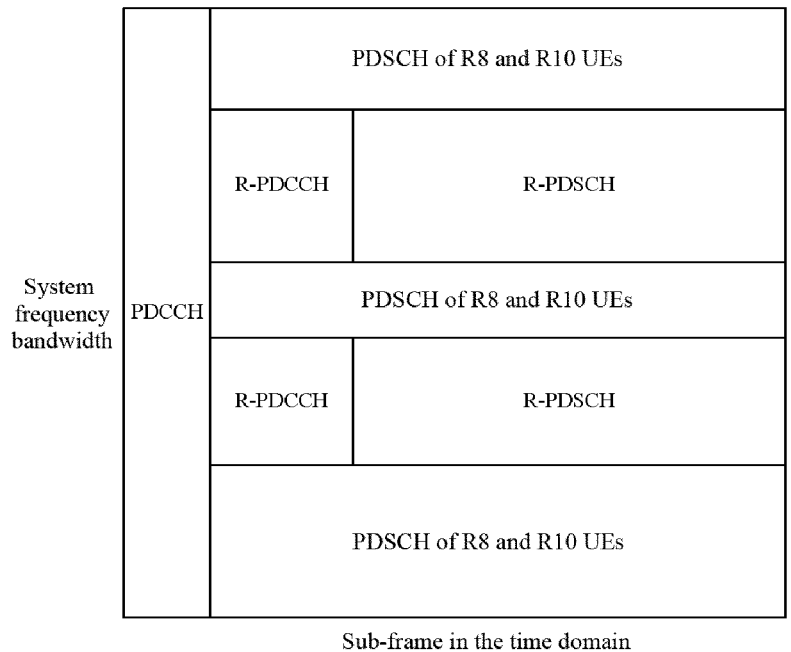
FIG. 2 is a schematic diagram of a multiplexing mode of TDM plus FDM in the prior art.
Figure 3:
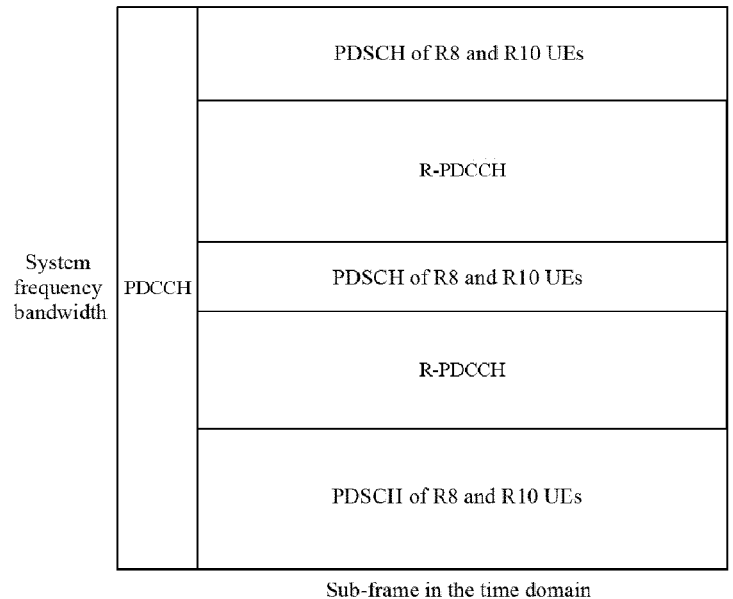
FIG. 3 is a schematic diagram of an FDM multiplexing mode in the prior art.
Figure 4:
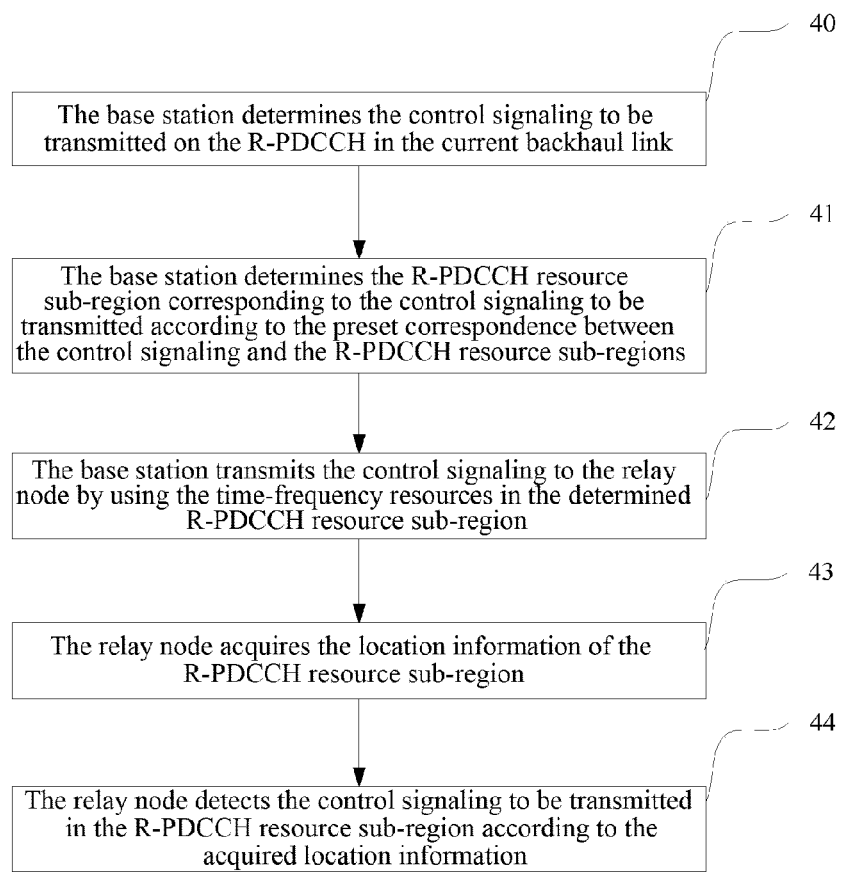
FIG. 4 is a schematic flow chart of a method according to an embodiment of the invention.

Referring to FIG. 4, an embodiment of the invention provides a method for transmitting and detecting control signaling in a backhaul link of a relay system, which particularly includes the following steps:

Step 40: A base station determines control signaling to be transmitted on a Relay Physical Downlink Control Channel (R-PDCCH) in a current backhaul link;

Step 41: The base station determines an R-PDCCH resource sub-region corresponding to the control signaling to be transmitted among a plurality of R-PDCCH resource sub-regions, into which a resource region occupied by the R-PDCCH is divided, according to a preset correspondence relationship between the control signaling and the R-PDCCH resource sub-region;

That is, the resource region occupied by the R-PDCCH is divided into a plurality of R-PDCCH resource sub-regions, and a correspondence relationship between each R-PDCCH resource sub-region and the control signaling is preset.

Step 42: The base station transmits the control signaling to be transmitted to a relay node by using time-frequency resources in the determined R-PDCCH resource sub-region;

Step 43 The relay node obtains location information of the R-PDCCH resource sub-region; and Step 44: The relay node detects the control signaling to be transmitted in the R-PDCCH resource sub-region according to the obtained location information.

At the base station side:

The resource region occupied by the R-PDCCH can be divided particularly as follows:

Many types of control signaling are divided into many categories; and the resource region occupied by the R-PDCCH is divided into a plurality of R-PDCCH resource sub-regions so that the number of R-PDCCH resource sub-regions included in the resource region is the same as the number of categories of the many types of control signaling;

Correspondingly, the correspondence relationships between the control signaling and the R-PDCCH resource sub-regions can be set particularly as follows:

For each of many categories into which the many types of control signaling are divided, a correspondence relationship between the category and an R-PDCCH resource sub-region among a plurality of R-PDCCH resource sub-regions is created; and for each type of control signaling among the many types of control signaling, a correspondence relationship between the control signaling and an R-PDCCH resource sub-region corresponding to the category to which the control signaling belongs is created.

Particularly, the many types of control signaling divided into many categories can be divided into two categories, and a first category of control signaling among the two categories has a higher demodulation delay requirement than that of a second category of control signaling; and the first category of control signaling includes downlink scheduling signaling (DL Grant), etc., and the second category of control signaling includes uplink scheduling signaling (UL Grant), etc.

Correspondingly, the resource region occupied by the R-PDCCH can be divided into a plurality of R-PDCCH resource sub-regions particularly as follows:

The resource region occupied by the R-PDCCH is divided into two R-PDCCH resource sub-regions, and a first R-PDCCH resource sub-region among the two R-PDCCH resource sub-regions is located preceding a second R-PDCCH resource sub-region in the time domain. For example, all the time units occupied by the first R-PDCCH resource sub-region precede all the time units occupied by the second resource sub-region; or a starting time unit of the first resource sub-region is the same as that of the second resource sub-region, and an ending time unit of the first resource sub-region precedes that of the second resource sub-region.

Correspondingly, the correspondence relationship between each category of control signaling and an R-PDCCH resource sub-region among a plurality of R-PDCCH resource sub-regions can be created particularly as follows:

A correspondence relationship between the first category of control signaling and the first R-PDCCH resource sub-region and a correspondence relationship between the second category of control signaling and the second R-PDCCH resource sub-region are created; or A correspondence relationship between the first category of control signaling and the first R-PDCCH resource sub-region and a correspondence relationship between the second category of control signaling and each of the first R-PDCCH resource sub-region and the second R-PDCCH resource sub-region are created.

Particularly, in the resource region occupied by the R-PDCCH in a sub-frame, the region consisted of resource units located in a first timeslot of the sub-frame is divided as the first R-PDCCH resource sub-region; and in the resource region occupied by the R-PDCCH in the sub-frame, the region consisted of resource units located in a second timeslot of the sub-frame is divided as the second R-PDCCH resource sub-region. That is, the first R-PDCCH resource sub-region is located in the first timeslot of the sub-frame in the time domain, and the second R-PDCCH resource sub-region is located in the second timeslot of the sub-frame in the time domain.

The base station can further transmit time-domain location information and/or frequency-domain location information of a plurality of R-PDCCH resource sub-regions after division to the relay node. The base station can further transmit the correspondence relationships between the control signaling and the R-PDCCH resource sub-regions to the relay node, or the base station and the relay node can make an agreement about the correspondence relationships between the control signaling and the R-PDCCH resource sub-regions.

In the invention, resources can be multiplexed for the R-PDCCH and the R-PDSCH in the FDM mode or in the mode of TDM plus FDM.

At the user equipment side:

In the step 43, the relay node obtains the pre-configured location information of one or more R-PDCCH resource sub-regions, where the R-PDCCH resource sub-regions are R-PDCCH resource sub-regions formed by dividing the resource region occupied by the R-PDCCH.

In the step 44, for each R-PDCCH resource sub-region, the relay node determines control signaling corresponding to the R-PDCCH resource sub-region according to a preset correspondence relationship between the R-PDCCH resource sub-region and the control signaling and detects the control signaling in the R-PDCCH resource sub-region according to the location information of the R-PDCCH resource sub-region. Since the correspondence relationship between the R-PDCCH resource sub-region and the control signaling at the base station side is consistent with that at the relay node side, the relay node can detect the control signaling transmitted in the step 42 in a specific R-PDCCH resource sub-region.

Particularly, a plurality of R-PDCCH resource sub-regions can be two R-PDCCH resource sub-regions, and then the RN firstly determines a first category of control signaling corresponding to a first R-PDCCH resource sub-region among the two R-PDCCH resource sub-regions and a second category of control signaling corresponding to a second R-PDCCH resource sub-region among the two R-PDCCH resource sub-regions according to the preset correspondence relationships between the R-PDCCH resource sub-regions and the control signaling; the first R-PDCCH resource sub-region is located preceding the second R-PDCCH resource sub-region in the time domain, for example, the first R-PDCCH resource sub-region and the second R-PDCCH resource sub-region satisfy the following condition: all the time units occupied by the first R-PDCCH resource sub-region precede all the time units occupied by the second R-PDCCH resource sub-region, or a starting time unit of the first R-PDCCH resource sub-region is the same as that of the second R-PDCCH resource sub-region and an ending time unit of the first R-PDCCH resource sub-region precedes that of the second R-PDCCH resource sub-region. And the first category of control signaling has a higher demodulation delay requirement than that of the second category of control signaling.

Then the RN detects the first category of control signaling in the first R-PDCCH resource sub-region according to the obtained location information of the first R-PDCCH resource sub-region; and detects the second category of control signaling in the second R-PDCCH resource sub-region according to the obtained location information of the second R-PDCCH resource sub-region.

The first category of control signaling can be detected in the first R-PDCCH resource sub-region particularly by detecting, in the resource region occupied by the R-PDCCH in a sub-frame, the first category of control signaling in the first R-PDCCH resource sub-region consisted of resource units located in a timeslot 1 of the sub-frame; and in the resource region occupied by the R-PDCCH in the sub-frame, the second category of control signaling is detected in the second R-PDCCH resource sub-region consisted of resource units located in a timeslot 2 of the sub-frame. The first category of control signaling includes DL Grant signaling, etc.; and the second category of control signaling includes UL Grant signaling, etc.

The relay node can obtain the pre-configured location information of the R-PDCCH resource sub-regions from semi-static signaling or dynamic signaling transmitted by the base station.

The invention will be described below in an embodiment.

In the present embodiment, a base station configures two sets of time-frequency resources of control signaling, S1 and S2, for each relay node, that is, a resource region occupied by an R-PDCCH is divided into two R-PDCCH resource sub-regions S1 and S2. The relay node detects corresponding control signaling respectively over the corresponding two sets of time-frequency resources. Furthermore, the control signaling can be divided into two categories, one of which is control signaling A sensitive to a demodulation delay of the control channel, that is, with a high demodulation delay requirement, and the other of which is control signaling B insensitive to a demodulation delay of the control channel, that is, with a low demodulation delay requirement. The control signaling A sensitive to the demodulation delay of the control channel is transmitted over the time-frequency resources S1, and the control signaling B insensitive to the demodulation delay of the control channel is transmitted over the time-frequency resources S2.

The control signaling A sensitive to the demodulation delay of the control channel can be DL Grant signaling. The control signaling B insensitive to the demodulation delay of the control channel can be UL Grant signaling or other control signaling. The time-frequency resources S1 or S2 include corresponding frequency-domain resources and time-domain resources. The frequency-domain resources include at least one set of Resource Blocks (RBs). The time-domain resources include a plurality of time transmission units, for example, Orthogonal Frequency Division Multiplexing (OFDM) symbols. The frequency-domain resources or the time-domain resources corresponding to S1 and S2 can be the same or different. For example, the frequency-domain resources corresponding to S1 may be RBs 1-3, and the time-domain resources corresponding to S1 may be OFDM symbols 5-7. The frequency-domain resources corresponding to S2 may be RBs 4-6, and the time-domain resources corresponding to S2 may be OFDM symbols 5-13. In another example, the frequency-domain resources corresponding to S1 may be PRBs 1-3, and the time-domain resources corresponding to S1 may be OFDM symbols 5-7. The frequency-domain resources corresponding to S2 may be PRBs 1-3, and the time-domain resources corresponding to S2 may be OFDM symbols 8-13. In the above examples, OFDM symbols in a sub-frame are numbered 1-14.

For S1 or S2, the locations of its time-domain resources or frequency-domain resources can be fixed. In this case, the base station will indicate only variable parts of the resource locations of S1 or S2 to the RN by dynamic signaling. For example, the locations of the time-domain resources of S1 are fixed to OFDM symbols 5-7, and the locations of the time-domain resources of S2 are fixed to OFDM symbols 5-13, and then the base station will indicate only the locations of the frequency-domain resources of S1 and S2 to the RN by dynamic signaling. For example, the locations of the time-domain resources of S1 are fixed to OFDM symbols 5-7, the locations of the time-domain resources of S2 are fixed to OFDM symbols 8-13, and the locations of the frequency-domain resources of S1 and S2 are the same, and then the base station will indicate only the locations of the frequency-domain resources of S1 and S2 to the RN by dynamic signaling. The base station will indicate the location information of the fixed time-domain resources or frequency-domain resources in advance to the RN by semi-static signaling.

The two R-PDCCH resource sub-regions can be divided into in accordance with the extent to which the control signaling is sensitive to the demodulation delay. In the LTE system, for example, as for DL Grant signaling, the signaling includes related control information for demodulating a data channel in the current sub-frame, so it is highly sensitive to the demodulation delay and shall be demodulated as soon as possible; and as for UL Grant signaling, it schedules an uplink sub-frame which is not in the current sub-frame but a subsequent uplink sub-frame, so it is weakly sensitive to the demodulation delay. Thus for the relay node, its blind detection for the R-PDCCH will be performed respectively in the two R-PDCCH resource sub-regions, that is, control signaling sensitive to the demodulation delay is detected blindly in one R-PDCCH resource sub-region, and control signaling insensitive to the demodulation delay is detected blindly in the other R-PDCCH resource sub-region.

Figure 5:
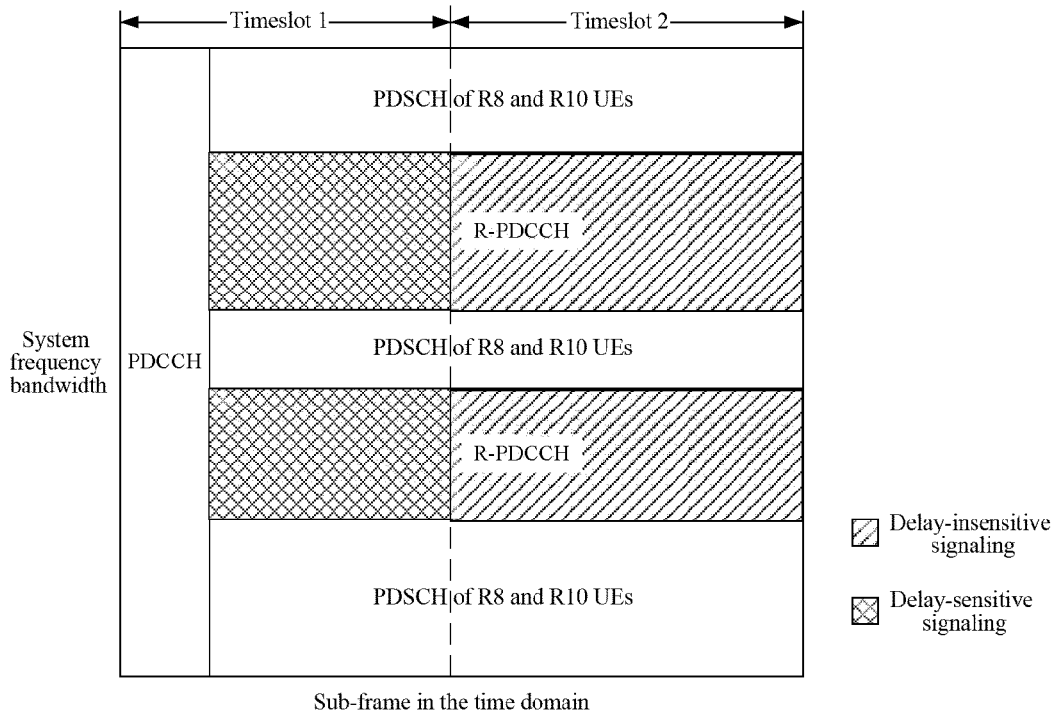
FIG. 5 is a schematic diagram of dividing a resource region according to a first embodiment of the invention.

First Embodiment:

FIG. 5 illustrates a schematic diagram of search spaces of two categories of control signaling in the case that the R-PDCCH and the R-PDSCH adopt an FDM multiplexing mode in the LTE-A system. The specific process includes:

Step S01: A base station divides many types of control signaling transmitted on the R-PDCCH into two categories according to demodulation delay requirements of the many types of control signaling, where a first category is control signaling with a high demodulation delay requirement, and a second category is control signaling with a low demodulation delay requirement; a resource region occupied by the R-PDCCH is divided into two R-PDCCH resource sub-regions, and as illustrated in FIG. 5, the R-PDCCH resource sub-region corresponding to the control signaling with the high demodulation delay requirement is a region in the resource region occupied by the R-PDCCH in a sub-frame, which is consisted of resource units located in a timeslot 1 of the sub-frame, referred to as a first R-PDCCH resource sub-region, and the R-PDCCH resource sub-region corresponding to the control signaling with the low demodulation delay requirement is a region in the resource region occupied by the R-PDCCH in the sub-frame, which is consisted of resource units located in a timeslot 2 of the sub-frame, referred to as a second R-PDCCH resource sub-region; and the base station transmits location information of resources of the first R-PDCCH resource sub-region and the second R-PDCCH resource sub-region to an RN;

Step S02: The base station transmits the first category of control signaling, e.g., DL Grant signaling, to the RN by using the resources in the first R-PDCCH resource sub-region, and the base station transmits the second category of control signaling, e.g., UL Grant signaling, to the RN by using the resources in the second R-PDCCH resource sub-region; and Step S03: The RN obtains the location information of the first R-PDCCH resource sub-region and the second R-PDCCH resource sub-region transmitted by the base station, and detects the first category of control signaling, e.g., DL Grant signaling, in the first R-PDCCH resource sub-region and detects the second category of control signaling, e.g., UL Grant signaling, in the second R-PDCCH resource sub-region according to the location information.

As can be seen from FIG. 5, the control signaling sensitive to the demodulation delay is put in the first timeslot for transmission so that it can be demodulated correspondingly at the end of the first timeslot and then a data part in the second timeslot can be demodulated as soon as possible. For example, downlink resource scheduling signaling needs to be demodulated as soon as possible so that a specific location, MCS and other contents of the R-PDSCH can be ascertained to thereby demodulate the R-PDSCH as soon as possible. The signaling insensitive to the demodulation delay is configured in the second timeslot of the R-PDCCH so that the signaling is demodulated at the same time as the data part of the R-PDSCH, but this part of signaling, e.g., uplink resource scheduling information, is irrelevant to demodulation of contents of the current sub-frame, so it can take a long period of time to demodulate the signaling.

In the case of FDM multiplexing, the location information of the R-PDCCH resource sub-regions can be notified to the RN in upper layer signaling specific to the RN; or the location information of the R-PDCCH resource sub-regions can be notified to the RN in broadcast signaling.

Figure 6:
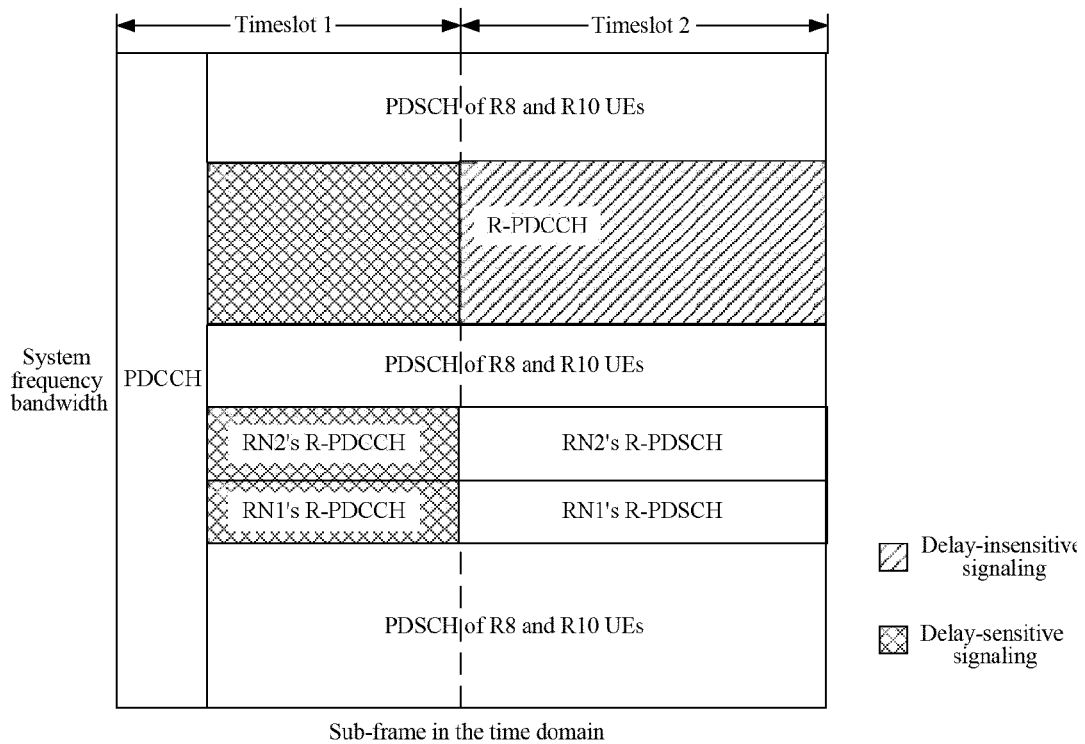
FIG. 6 is a schematic diagram of dividing a resource region according to a second embodiment of the invention.

Second Embodiment:

FIG. 6 illustrates a schematic diagram of search spaces of two categories of control signaling in the case that the R-PDCCH and the R-PDSCH adopt a multiplexing mode of TDM plus FDM in the LTE-A system. The specific process includes:

Step S11: A base station divides many types of control signaling transmitted on the R-PDCCH into two categories according to demodulation delay requirements of the many types of control signaling, where a first category is control signaling with a high demodulation delay requirement, and a second category is control signaling with a low demodulation delay requirement; a resource region occupied by the R-PDCCH is divided into two R-PDCCH resource sub-regions, and as illustrated in FIG. 6, the R-PDCCH resource sub-region corresponding to the control signaling with the high demodulation delay requirement is a region in the resource region occupied by the R-PDCCH in a sub-frame, which is consisted of resource units located in a timeslot 1 of the sub-frame, referred to as a first R-PDCCH resource sub-region, and the R-PDCCH resource sub-region corresponding to the control signaling with the low demodulation delay requirement is a region in the resource region occupied by the R-PDCCH in the sub-frame, which is consisted of resource units located in a timeslot 2 of the sub-frame, referred to as a second R-PDCCH resource sub-region; and location information of resources of the first R-PDCCH resource sub-region and the second R-PDCCH resource sub-region is transmitted to an RN;

Step S12: The base station transmits the first category of control signaling, e.g., DL Grant signaling, to the RN in the first R-PDCCH resource sub-region, and the base station transmits the second category of control signaling, e.g., UL Grant signaling, to the RN in the second R-PDCCH resource sub-region; and Step S13: The RN obtains the location information of the first R-PDCCH resource sub-region and the second R-PDCCH resource sub-region transmitted by the base station, and detects the first category of control signaling, e.g., DL Grant signaling, in the first R-PDCCH resource sub-region and detects the second category of control signaling, e.g., UL Grant signaling, in the second R-PDCCH resource sub-region according to the location information.

Figure 7:
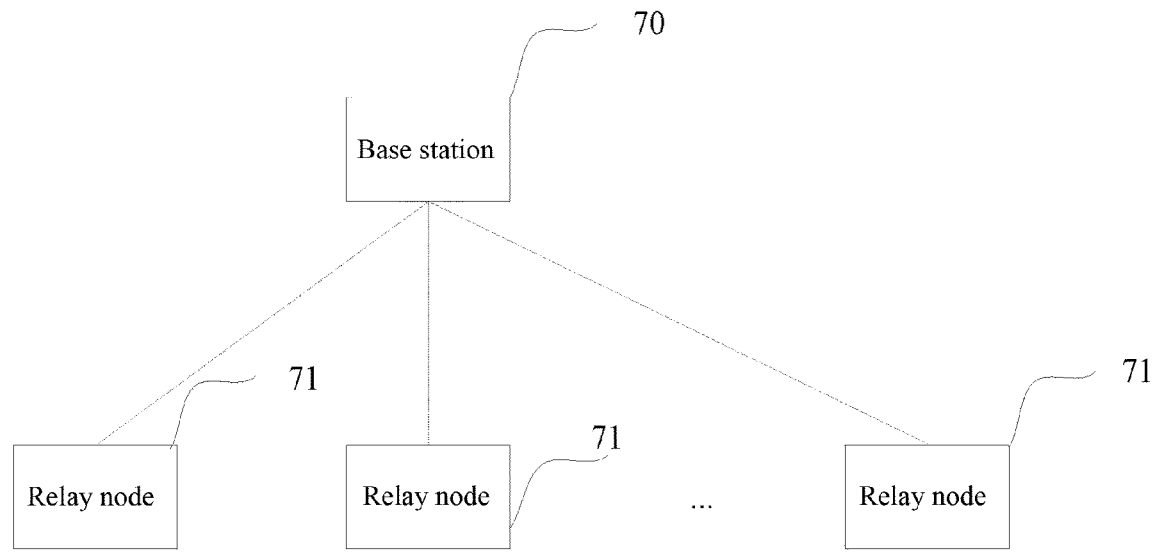
FIG. 7 is a schematic structural diagram of a system according to an embodiment of the invention.

Referring to FIG. 7, an embodiment of the invention further provides an LTE-A communication system including:

A base station 70 configured to determine control signaling to be transmitted on an R-PDCCH in a current backhaul link; to determine an R-PDCCH resource sub-region corresponding to the control signaling to be transmitted among a plurality of R-PDCCH resource sub-regions, into which a resource region occupied by the R-PDCCH is divided, according to a preset correspondence relationship between the control signaling and the R-PDCCH resource sub-region; and to transmit the control signaling to be transmitted to a relay node by using time-frequency resources in the determined R-PDCCH resource sub-region; and The relay node 71 configured to obtain the pre-configured location information of the R-PDCCH resource sub-region and to detect the control signaling to be transmitted in the R-PDCCH resource sub-region according to the location information.

The base station 70 is further configured:

To divide the resource region occupied by the R-PDCCH into two R-PDCCH resource sub-regions; and A first R-PDCCH resource sub-region among the two R-PDCCH resource sub-regions is located preceding a second R-PDCCH resource sub-region in the time domain.

The base station 70 is further configured:

To create a correspondence relationship between a first category of control signaling and the first R-PDCCH resource sub-region; and To create a correspondence relationship between a second category of control signaling and the second R-PDCCH resource sub-region, The first category of control signaling has a higher demodulation delay requirement than that of the second category of control signaling.

The base station 70 is further configured:

To divide a region in the resource region occupied by the R-PDCCH in a sub-frame, which is consisted of resource units located in a first timeslot of the sub-frame, as the first R-PDCCH resource sub-region; and To divide a region in the resource region occupied by the R-PDCCH in the sub-frame, which is consisted of resource units located in a second timeslot of the sub-frame, as the second R-PDCCH resource sub-region.

Figure 8:
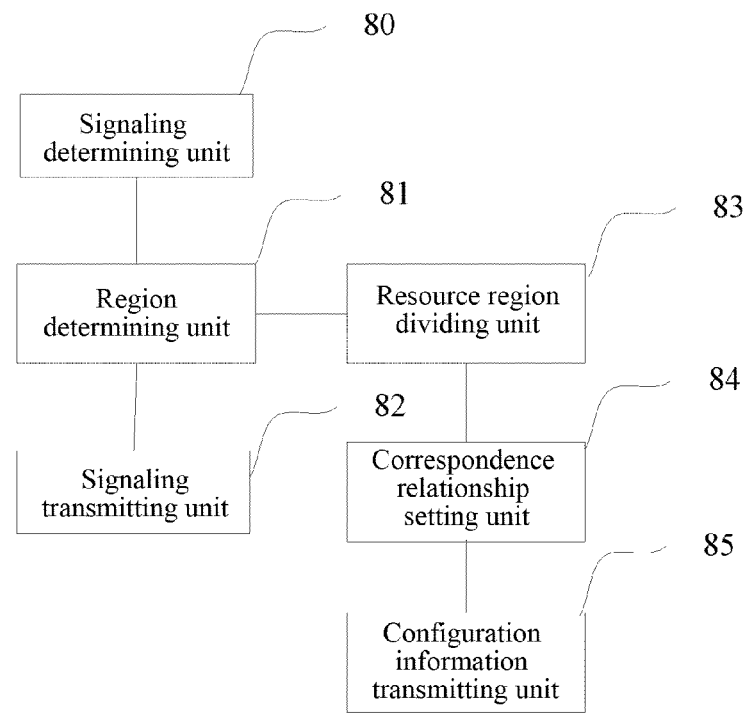
FIG. 8 is a schematic structural diagram of a base station according to an embodiment of the invention.

Referring to FIG. 8, an embodiment of the invention further provides a base station which can be applicable to the LTE-A communication system, and the base station includes:

A signaling determining unit 80 configured to determine control signaling to be transmitted on an R-PDCCH in a current backhaul link;

A region determining unit 81 configured to determine an R-PDCCH resource sub-region corresponding to the control signaling to be transmitted among a plurality of R-PDCCH resource sub-regions, into which a resource region occupied by the R-PDCCH is divided, according to a preset correspondence relationship between the control signaling and the R-PDCCH resource sub-region; and A signaling transmitting unit 82 configured to transmit the control signaling to be transmitted to a relay node by using time-frequency resources in the determined R-PDCCH resource sub-region.

The base station further includes:

A resource region dividing unit 83 configured to divide the resource region occupied by the R-PDCCH into two R-PDCCH resource sub-regions, where a first R-PDCCH resource sub-region among the two R-PDCCH resource sub-regions is located preceding a second R-PDCCH resource sub-region in the time domain.

The base station further includes:

A correspondence relationship setting unit 84 configured to create a correspondence relationship between a first category of control signaling and the first R-PDCCH resource sub-region and to create a correspondence relationship between a second category of control signaling and the second R-PDCCH resource sub-region, where the first category of control signaling has a higher demodulation delay requirement than that of the second category of control signaling.

The resource region dividing unit 83 is configured:

To divide a region in the resource region occupied by the R-PDCCH in a sub-frame, which is consisted of resource units located in a first timeslot of the sub-frame, as the first R-PDCCH resource sub-region; and To divide a region in the resource region occupied by the R-PDCCH in the sub-frame, which is consisted of resource units located in a second timeslot of the sub-frame, as the second R-PDCCH resource sub-region.

The base station further includes:

A configuration information transmitting unit 85 configured to transmit time-domain location information and/or frequency-domain location information of a plurality of R-PDCCH resource sub-regions to the relay node.

The configuration information transmitting unit 85 is further configured:

To transmit the correspondence relationships between the control signaling and the R-PDCCH resource sub-regions to the relay node.

Figure 9:
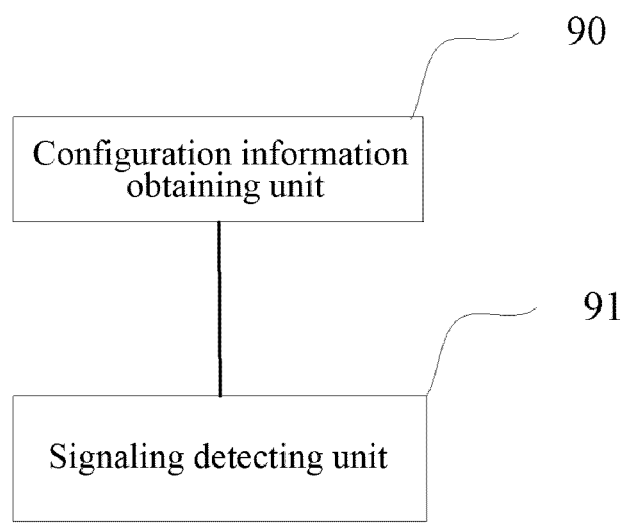
FIG. 9 is a schematic structural diagram of an RN according to an embodiment of the invention.

Referring to FIG. 9, an embodiment of the invention further provides a relay node which can be applicable to the LTE-A communication system, and the relay node includes:

A configuration information obtaining unit 90 configured to obtain pre-configured location information of one or more R-PDCCH resource sub-regions, where the R-PDCCH resource sub-regions are R-PDCCH resource sub-regions formed by dividing a resource region occupied by an R-PDCCH; and A signaling detecting unit 91 configured, for each R-PDCCH resource sub-region among the one or more R-PDCCH resource sub-regions, to determine control signaling corresponding to the R-PDCCH resource sub-region according to a preset correspondence relationship between the R-PDCCH resource sub-region and the control signaling and to detect the control signaling in the R-PDCCH resource sub-region according to the location information of the R-PDCCH resource sub-region.

The signaling detecting unit 91 includes:

A determining unit configured, when a plurality of R-PDCCH resource sub-regions are two R-PDCCH resource sub-regions, to determine a first category of control signaling corresponding to a first R-PDCCH resource sub-region among the two R-PDCCH resource sub-regions and a second category of control signaling corresponding to a second R-PDCCH resource sub-region among the two R-PDCCH resource sub-regions according to the preset correspondence relationships between the R-PDCCH resource sub-regions and the control signaling, where the first R-PDCCH resource sub-region is located preceding the second R-PDCCH resource sub-region in the time domain, and the first category of control signaling has a higher demodulation delay requirement than that of the second category of control signaling; and A detecting unit configured to detect the first category of control signaling in the first R-PDCCH resource sub-region according to the obtained location information of the first R-PDCCH resource sub-region; and to detect the second category of control signaling in the second R-PDCCH resource sub-region according to the obtained location information of the second R-PDCCH resource sub-region.

The detecting unit is configured:

To detect, in the resource region occupied by the R-PDCCH in a sub-frame, the first category of control signaling in the first R-PDCCH resource sub-region consisted of resource units located in a first timeslot of the sub-frame; and To detect, in the resource region occupied by the R-PDCCH in the sub-frame, the second category of control signaling in the second R-PDCCH resource sub-region consisted of resource units located in a second timeslot of the sub-frame.

The detecting unit is configured:

To detect DL Grant signaling in the first R-PDCCH resource sub-region; and to detect UL Grant signaling in the second R-PDCCH resource sub-region.

In summary, advantageous effects of the invention include:

In the solution according to the embodiments of the invention, the base station determines control signaling to be transmitted of the current R-PDCCH; determines the R-PDCCH resource sub-region corresponding to the control signaling to be transmitted among a plurality of R-PDCCH resource sub-regions, into which the resource region occupied by the R-PDCCH is divided, according to the preset correspondence relationship between the control signaling and the R-PDCCH resource sub-region; and then transmits the control signaling to be transmitted to the relay node by using time-frequency resources in the determined R-PDCCH resource sub-region. As can be seen, in the invention, the resource region occupied by the R-PDCCH is divided into a plurality of R-PDCCH resource sub-regions, and the control signaling to be transmitted is transmitted in the R-PDCCH resource sub-region corresponding to the control signaling to be transmitted instead of transmitting the control signaling to be transmitted in the entire resource region occupied by the R-PDCCH, thereby saving time-frequency resources occupied by the base station to transmit the control signaling on the R-PDCCH.

Correspondingly, when detecting the control signaling, the relay node firstly obtains the pre-configured location information of one or more R-PDCCH resource sub-regions into which the resource region occupied by the R-PDCCH is divided; and then for each R-PDCCH resource sub-region, determines the control signaling corresponding to the R-PDCCH resource sub-region according to the preset correspondence relationship between the R-PDCCH resource sub-region and the control signaling and detects the control signaling in the R-PDCCH resource sub-region according to the location information of the R-PDCCH resource sub-region. As can be seen, in the invention, the relay node detects the control signaling in the R-PDCCH resource sub-region corresponding to the control signaling according to the configuration information instead of detecting the control signaling in the entire resource region occupied by the R-PDCCH, thereby effectively reducing the complexity for the relay node to detect the R-PDCCH.

Simultaneously, the solution proposed in this patent categorizes R-PDCCH contents according to a categorization criterion that whether the information is sensitive to a demodulation delay. The two categories of information are configured respectively with search spaces and also in combination with a multiplexing mode, thereby simplifying the complexity of standardization while guaranteeing the demodulation delay.

Evidently, those skilled in the art can make various modifications and variations to the invention without departing from the spirit and the scope of the invention. Thus the invention is also intended to encompass these modifications and variations as long as these modifications and variations come into the scope of the claims appended to the invention and their equivalents.

The invention claimed is:

1. A method for transmitting control signaling in a backhaul link of a relay system, the method comprising:

determining, by a base station, control signaling to be transmitted on a Relay Physical Downlink Control Channel, R-PDCCH, in a current backhaul link;

determining, by the base station, an R-PDCCH resource sub-region corresponding to the control signaling to be transmitted among as plurality of R-PDCCH resource sub-regions, into which a resource region occupied by the R-PDCCH is divided, according to a preset correspondence relationship between the control signaling and the R-PDCCH resource sub-region; and transmitting, by the base station, the control signaling to be transmitted to a relay node by using time-frequency resources in the determined R-PDCCH resource sub-region, wherein the resource region occupied by the R-PDCCH is divided into two R-PDCCH resource sub-regions, wherein a first R-PDCCH resource sub-region among the two R-PDCCH resource sub-regions is located preceding a second R-PDCCH resource sub-region in the time domain; and wherein the preset correspondence relationship comprises a correspondence relationship between a first category of control signaling and the first R-PDCCH resource sub-region and a correspondence relationship between a second category of control signaling and the second R-PDCCH resource sub-region, wherein the first category of control signaling has a higher demodulation delay requirement than that of the second category of control signaling.

2. The method according to claim 1, wherein,
the first category of control signaling comprises downlink scheduling signaling DL Grant; and
the second category of control signaling comprises uplink scheduling signaling UL.

3. The method according to claim 1, wherein it is determined that the first R-PDCCH resource sub-region is located preceding the second R-PDCCH resource sub-region in the time domain when the following relationship is satisfied:
all the time units occupied by the first R-PDCCH resource sub-region precede all the time units occupied by the second R-PDCCH resource sub-region; or
a starting time unit of the first R-PDCCH resource sub region is the same as that of the second R-PDCCH resource sub-region, and an ending time unit of the first R-PDCCH resource sub-region precedes that of the second R-PDCCH resource sub-region.

4. The method according to claim 3, wherein,
the first R-PDCCH resource sub-region is located in a first time lot of a sub-frame in time domain; and
the second R-PDCCH resource sub-region is located in a second timeslot the sub-frame in the time domain, or the second R-PDCCH resource sub-region is located in the first timeslot and the second timeslot of the sub-frame in the time domain.

5. The method according to claim 1, further comprising a step A and/or a step B:
the step A, transmitting, by the base station, time-domain location information and/or frequency-domain location information of a plurality of R-PDCCH resource sub-regions to the relay node; and
the step B, transmitting, by the base station, the correspondence relationships between the control signaling and the R-PDCCH resource sub-regions to the relay node.

6. A method for detecting control signaling in a backhaul link or a relay system, the method comprising:
obtaining, by a relay node, location information of one or more Relay Physical Downlink Control Channel, R-PDCCH, resource sub-regions, wherein the R-PDCCH resource sub-regions are R-PDCC,H resource sub-regions formed by dividing a resource region occupied by an R-PDCCH; and
for each R-PDCCH resource sub-region among the one or more R-PDCCH resource sub-regions, determining control signaling corresponding to the R-PDCCH resource sub-region according to a preset correspondence relationship between the R-PDCCH resource sub-region and the control signaling and detecting the control signaling in the R-PDCCH resource sub-region according to the location information of the R-PDCCH resource sub-region, wherein the one or more R-PDCCH resource sub-regions comprise two R-PDCCH resource sub-regions, wherein a first R-PDCCH resource sub-region among the two R-PDCCH resource sub-regions is located preceding a second -PDCCH resource sub-region in the time domain: and wherein the preset correspondence relationship comprises a correspondence relationship between a first category of control signaling and the lust R-PDCCH resource sub-region and a correspondence relationship between a second category of control signaling and the second R-PDCCH resource sub-regions wherein the first category of control signaling has a higher demodulation delay requirement than that of the second category of control signaling.

7. The method according to claim 6, wherein for each R-PDCCH resource sub-region among the one or more R-PDCCH resource sub-regions, determining the control signaling corresponding to the R-PDCCH resource sub-region according to the preset correspondence relationship between the R-PDCCH resource sub-region and the control signaling and detecting the control signaling in the R-PDCCH resource sub-region according to the location information of the R-PDCCH resource sub-region comprises:
determining the first category of control signaling corresponding to the first R-PDCCH resource sub-region among the two R-PDCCH resource sub-regions and the second category of control signaling corresponding to the second R-PDCCH resource sub-region among the two R-PDCCH resource sub-regions according to the preset correspondence relationships between the R-PDCCH resource sub-regions and the control signaling; and
detecting the first category of control signaling in the first R-PDCCH resource sub-region according to the obtained location information Of the first R-PDCCH resource sub-region; and detecting the Second category, of control signaling in the second R-PDCCH resource sub-region according to the obtained location information of the second R-PDCCH resource sub-region.

8. The method according to claim 7, wherein detecting the first category of control signaling in the first R-PDCCH resource sub-region comprises:
detecting, in the resource region occupied by the R-PDCCH in a sub-frame, the first category of control signaling in the first R-PDCCH resource sub-region consisted of resource units located in a first timeslot of the sub-frame; and
detecting, in the resource region occupied by the R-PDCCH in the sub-frame, the second category of control signaling in the second R-PDCCH resource sub-region consisted of resource units located in a second timeslot of the sub-frame, or detecting, in the resource region occupied by the R-PDCCH in the sub-frame, the second category of control signaling in the second R-PDCCH resource sub-region consisted of resource units located in the first timeslot and the second timeslot of the sub-frame.

9. The method according to claim 7, wherein,
detecting the first category of control signaling comprises detecting downlink scheduling signaling DL Grant; and
detecting the second category of control signaling comprises detecting uplink scheduling signaling UL Grant.

10. The method according to claim 8, wherein,
detecting the first category of control signaling comprises detecting downlink scheduling signaling DL Grant and
detecting the second category of control signaling comprises detecting scheduling signaling UL Grant.

11. A relay node comprising:
a configuration information obtaining unit configured to obtain location information of one or more Relay Physical Downlink Control Channel, R-PDCCH, resource sub-regions, wherein the R-PDCCH resource sub-regions are R-PDCCH resource sub-regions formed by dividing a resource region occupied by an R-PDCCH; and
signaling detecting unit configured, for each R-PDCCH resource sub-region among the one or more R-PDCCH resource sub-regions, to determine control signaling corresponding to the R-PDCCH resource sub-region according to a preset correspondence relationship between the R-PDCCH resource sub-region and the control signaling and to detect the control signaling in the R-PDCCH resource sub-region according to the location information of the R-PDCCH resource sub-regions,
wherein one or more resource sub-regions comprise two R-PDCCH resource sub-regions, wherein a first R-PDCCH resource sub-region among the two R-PDCCH resource sub-regions is located preceding a second R-PDCCH resource sub-regions in the time domain: and
wherein the preset correspondence relationship comprises a correspondence relationship between a first category of control signaling and the first R-PDCCH resource sub-region and a correspondence relationship between a second category of control signaling second R-PDCCH resource sub-region, wherein the first category of control signaling a higher demodulation delay requirement than the second category control signaling.

12. The relay node according to claim 11, wherein the signaling detecting unit comprises:
a determining unit configured, to determine a the first category of control signaling corresponding to the first R-PDCCH resource sub-region among the two R-PDCCH resource sub-regions and the second category of control signaling corresponding to the second R-PDCCH resource sub-region among the two R-PDCCH resource sub-regions according to preset correspondence relationships between the R-PDCCH resource sub-regions and the control signaling; and
a detecting nit configured to detect the first category of control signaling in the first R-PDCCH resource sub-region according to the obtained location information of the first R-PDCCH resource sub-region; and to detect the second category of control signaling in the second R-PDCCH resource sub-region according to the obtained location information of the second R-PDCCH resource sub-region.

13. The relay node according to claim 12, wherein the detecting unit configured
to detect, in the resource region occupied by the R-PDCCH in a sub-frame, the first category of control signaling in the first R-PDCCH resource sub-region consisted of resource units located in a first timeslot of the sub-frame; and
to detect, in the resource region occupied by the R-PDCCH in the sub-frame, the second category of control signaling in the second R-PDCCH resource sub-region consisted of resource units located in a second timeslot of the sub-frame, or detect, in the resource region occupied by the R-PDCCH in the sub-frame, the second category of control signaling in the second R-PDCCH resource sub-region consisted of resource units located in the first timeslot and the second timeslot of the sub-frame.

* * * * *